United States Patent
Migdal et al.

(10) Patent No.: US 12,262,148 B2
(45) Date of Patent: *Mar. 25, 2025

(54) MECHANISM FOR VIDEO REVIEW AT A SELF-CHECKOUT TERMINAL

(71) Applicant: NCR Voyix Corporation, Atlanta, GA (US)

(72) Inventors: Joshua Migdal, Wayland, MA (US); Chris Wible, Cambridge, MA (US); Malay Kundu, Lexington, MA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,578

(22) Filed: Sep. 26, 2022

(65) Prior Publication Data

US 2023/0020493 A1 Jan. 19, 2023

Related U.S. Application Data

(63) Continuation of application No. 15/708,037, filed on Sep. 18, 2017, now Pat. No. 11,477,415.

(60) Provisional application No. 62/396,073, filed on Sep. 16, 2016.

(51) Int. Cl.
| | |
|---|---|
| *H04N 7/18* | (2006.01) |
| *G06Q 20/20* | (2012.01) |
| *G07G 1/00* | (2006.01) |
| *G07G 3/00* | (2006.01) |
| *G08B 13/196* | (2006.01) |

(52) U.S. Cl.
CPC ............. *H04N 7/181* (2013.01); *G06Q 20/20* (2013.01); *G06Q 20/203* (2013.01); *G06Q 20/208* (2013.01); *G07G 1/0072* (2013.01); *G07G 3/003* (2013.01); *G08B 13/19673* (2013.01); *G08B 13/19682* (2013.01); *G06T 2207/30232* (2013.01)

(58) Field of Classification Search
CPC ...... H04N 7/181; G06Q 20/20; G06Q 20/203; G06Q 20/208; G07G 1/0072; G07G 3/003; G08B 13/19673; G08B 13/19682; G06T 2207/30232

See application file for complete search history.

(56) References Cited

U.S. PATENT DOCUMENTS

| | | | | |
|---|---|---|---|---|
| 7,631,808 B2 * | 12/2009 | Kundu | ................... | G06V 20/41 |
| | | | | 235/383 |
| 8,146,811 B2 * | 4/2012 | Kundu | ...................... | G06T 7/74 |
| | | | | 382/209 |
| 8,462,212 B1 * | 6/2013 | Kundu | ................. | G07G 1/0081 |
| | | | | 348/150 |

(Continued)

*Primary Examiner* — Richard A Hansell, Jr.
(74) *Attorney, Agent, or Firm* — Schwegman Lundberg & Woessner, P.A.

(57) ABSTRACT

A system and method for replaying a security video at the time of a fraudulent incident at a point-of-sale checkout terminal is presented. The video playback takes place in real-time, when the event occurs, allowing personnel to take appropriate measures, corrective or otherwise, to deal with the event. Examples of such events may include when a weight-based security alert is triggered at a self-checkout, when a cashier or customer has missed scanning an item at the checkout, or other possible events where rapid replay of relevant video is required.

12 Claims, 4 Drawing Sheets

(56) References Cited

U.S. PATENT DOCUMENTS

| | | | | |
|---|---|---|---|---|
| 8,570,375 B1* | 10/2013 | Srinivasan | | H04N 7/181 |
| | | | | 235/383 |
| 9,113,051 B1* | 8/2015 | Scalisi | | H04N 7/188 |
| 2005/0110634 A1* | 5/2005 | Salcedo | | G08B 13/19673 |
| | | | | 340/539.1 |
| 2005/0177859 A1* | 8/2005 | Valentino, III | | G08B 13/19656 |
| | | | | 348/E7.086 |
| 2007/0166001 A1* | 7/2007 | Barton | | G11B 27/3054 |
| | | | | 386/230 |
| 2007/0212031 A1* | 9/2007 | Hikita | | H04N 21/23 |
| | | | | 348/E7.086 |
| 2008/0226129 A1* | 9/2008 | Kundu | | G07G 1/0036 |
| | | | | 382/103 |
| 2014/0176719 A1* | 6/2014 | Migdal | | G08B 29/188 |
| | | | | 348/150 |
| 2014/0338987 A1* | 11/2014 | Kobres | | G01G 19/4144 |
| | | | | 177/1 |
| 2015/0121409 A1* | 4/2015 | Zhang | | H04H 60/85 |
| | | | | 725/18 |
| 2015/0193780 A1* | 7/2015 | Migdal | | G06Q 30/018 |
| | | | | 705/317 |
| 2016/0210515 A1* | 7/2016 | Heier | | G06Q 20/20 |
| 2016/0364123 A1* | 12/2016 | Burns | | H04N 7/181 |
| 2017/0251183 A1* | 8/2017 | Crooks | | G06V 20/52 |
| 2018/0068189 A1* | 3/2018 | Daliyot | | G06F 3/04842 |
| 2018/0113577 A1* | 4/2018 | Burns | | G06F 16/739 |

\* cited by examiner

MECHANISM FOR VIDEO REVIEW AT A SELF-CHECKOUT TERMINAL

CROSS-REFERENCE TO RELATED APPLICATION

This application is a continuation of U.S. application Ser. No. 15/708,037, filed on Sep. 18, 2017, which application claims priority to U.S. Provisional Patent Application Ser. No. 62/396,073, filed on Sep. 16, 2016, which applications and publications are incorporated herein by reference in their entirety.

TECHNICAL FIELD

The present invention relates generally to a security system and method to prevent fraudulent activities occurring at a self-checkout terminal.

BACKGROUND

Providing an instant replay of a video clip has been around in industries such as, sports broadcasting and video streaming. Likewise, digital video recorders are capable of playing back video from any time period, including live-streaming of the present. Home DVRs also have the capability of playing back video at different rates, skipping commercials, replaying live video, and, via sped-up video, catching up to the current moment to continue streaming live.

To facilitate a video playback system at a point-of-sale device for loss prevention effort, a coupling mechanism needs to exist utilizing supplemental data feeds. A store clerk at the store often cannot monitor every single checkout terminals instantly. Often a store clerk would rewind the video recordings to identify when a loss incident might have happened and review the footage. This presents an inefficient system for reviewing and identifying a fraudulent activity at the checkout terminals.

One of the primary duties of a self-checkout attendant is to monitor the transactions taking place and to respond to alerts from the self-checkout. One such alert is a weight-mismatch alert, in which a customer scans an item, places an item in the bagging area, the self-checkout registers its weight, and responds with an alert due to the weight not matching the expected weight of the item scanned. The attendant then may go over to the self-checkout to clear the alert before more scanning of the items or goods can proceed. Lacking information of what caused the alert, the attendant often clears the alert without investigating the underlying cause. Similarly, the cause of the alert may be inaccurately identified.

As such there is a need for a system and method that provides an instant video playback of an item suspected of fraudulent activity at a checkout terminal.

SUMMARY

The subject matter of this application may involve, in some cases, interrelated products, alternative solutions to a particular problem, and/or a plurality of different uses of a single system or article.

In one aspect, a video playback system that generates a video playback of a fraudulent activity at a checkout terminal is provided. The video playback system may be in communication with a database. The system may comprise a video source generating a video feed that captures a transaction area of the checkout terminal. The video feed may be stored by the database. The system further comprises a weight sensor positioned at the checkout terminal and operatively coupled to the checkout terminal. The weight sensor may obtain a weight of an item being transacted at the checkout terminal. The checkout terminal may operatively communicate with the database. The checkout terminal may compare the weight of the item with an expected weight of the item where the database comprises the expected weight corresponding to the item. Further, the checkout terminal may identify a transaction time of the item when the weight of the item is dissimilar to the expected weight. Further yet, the checkout terminal may obtain the video playback from the video feed and determine a start time of the video playback based on the identified transaction time. Finally, the checkout terminal may generate the video playback from the start time to an end time. The video playback captures, at least a portion of, a duration of the item being transacted at the transaction area.

In another aspect, a video playback device, with a processor and a memory, may be implemented at a checkout terminal to generate a video playback of a fraudulent activity. The video playback device may comprise a video source generating a video feed to capture a transaction area of the checkout terminal. the video feed may be stored by a database in communication with the video playback device. The video playback device may further comprise the checkout terminal identifying a discrepant transaction data feed of an item being scanned at the checkout terminal. The video playback device may be in communication with the checkout terminal to identify a transaction time of the item corresponding to the discrepant transaction data feed. The video playback device may further obtain the video playback from the video feed and determine a start time of the video playback based on the identified transaction time. Finally, the video playback device may generate the video playback from the start time to an end time, where the video playback captures, at least a portion of, a duration of the item being transacted at the transaction area.

DESCRIPTION OF THE DRAWINGS

These and other advantages of the present invention may be readily understood with the reference to the following specifications and attached drawings wherein.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In referring to the description, specific details are set forth in order to provide a thorough understanding of the examples disclosed. In other instances, well-known methods, procedures, components and materials have not been described in detail as not to unnecessarily lengthen the present disclosure.

Preferred embodiments of the present invention may be described hereinbelow with reference to the accompanying drawings. In the following description, well-known functions or constructions are not described in detail because they may obscure the invention in unnecessary detail. No language in the specification should be construed as indicating any unclaimed element as essential to the practice of the embodiments. For this disclosure, the following terms and definitions shall apply:

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code stored to a computer readable medium, such as a memory device (if any is necessary) to perform the function, regardless of whether performance of the function is disabled or not enabled (e.g., by an operator-configurable setting, factory trim, etc.).

It should be understood that if an element or part is referred herein as being "on", "against", "in communication with", "connected to", "attached to", or "coupled to" another element or part, then it can be directly on, against, in communication with, connected, attached or coupled to the other element or part, or intervening elements or parts may be present.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form. Database as used herein may be in the format including, but are not limiting to, XML, JSON, CSV, binary, over any connection type: serial, Ethernet, etc. over any protocol: UDP, TOP, and the like.

The term "exemplary" means serving as a non-limiting example, instance, or illustration. Likewise, the terms "e.g." and "for example" set off lists of one or more non-limiting examples, instances, or illustrations.

The term "network" as used herein includes both networks and inter-networks of all kinds, including the Internet, and is not limited to any particular network or inter-network.

Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications, Examples include, but are not limited to, Picture Transfer Protocol (PTP) over Internet Protocol (IP), IP over Bluetooth, IP over WiFi, and PTP over IP networks (PTP/IP).

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations.

As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Various operations may be described as multiple discrete operations in turn, in a manner that may be helpful in understanding embodiments; however, the order of description should not be construed to imply that these operations are order dependent.

Spatially relative terms, such as "under" "beneath", "below", "lower", "above", "upper", "proximal", "distal", and the like, may be used herein for ease of description and/or illustration to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable. Such descriptions are merely used to facilitate the discussion and are not intended to restrict the application of disclosed embodiments.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

Some embodiments of the present invention may be practiced on a computer system that includes, in general, one or a plurality of processors for processing information and instructions, RAM, for storing information and instructions, ROM, for storing static information and instructions, a memory device and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer, controller or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed invention may be practiced. It is to be understood, however, that those skilled in the art may develop other structural and functional modifications without departing from the novelty and scope of the instant disclosure.

The system may comprise one or more computers or computerized elements in communication working together to carry out the different functions of the system. The invention contemplated herein further may comprise a memory device, such as a non-transitory computer readable media configured to instruct a computer or computers to carry out the steps and functions of the system and method, as described herein. In some embodiments, the communication among the one or more computer or the one or more processors alike, may support a plurality of encryption/decryption methods and mechanisms of various types of data.

The computerized user interface may be comprised of one or more computing devices in networked communication with each other. The computer or computers of the computerized user interface contemplated herein may comprise a memory, processor, and input/output system. In some embodiments, the computer may further comprise a networked connection and/or a display screen. These computerized elements may work together within a network to provide functionality to the computerized user interface. The computerized user interface may be any type of computerized interfaces known hi the art capable of allowing a user to input data and receive a feedback therefrom. The computerized user interface may further provide outputs executed by the system contemplated herein.

Computer or computing device contemplated herein may include, but are not limited to, virtual systems, Cloud/remote systems, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Video source or video camera contemplated herein may include, but are not limited to, a video camera such as, analog cameras and IP cameras, and the like; a device that can provide a video feed of any duration, such as a ©VR; a portable computing device having a camera, such as a tablet computer, laptop computer; and the like.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms. Data contemplated herein may be in the format including, but are not limiting to, XML, JSON, CSV, binary, over any connection type: serial, Ethernet, etc. over any protocol: UDP, TOP, and the like.

Scanner contemplated herein may process any type of machine-readable medium, including but not limited to a barcode, a OR code, two-dimensional bar code, a prescribed font, optical character recognition (OCR) characters, Radio Frequency Identification (RFID), Near-Field Communication (NFC), Bluetooth technology, alphanumeric characters, non-alphanumeric characters, symbols, facial recognition and the like.

The system and device disclosed herein may be implemented as a standalone and dedicated device including hardware and installed software, where the hardware is closely matched to the requirements and/or functionality of the software. The system and device may be installed on or integrated with a network appliance (not shown) configured to establish the network among the components of the system. The system and the network appliance may be capable of operating as or providing an interface to assist exchange of software instructions and data among the components of the system.

The system and device disclosed herein may implement a server. The server may be implemented as any of a variety of computing devices, including, for example, a general purpose computing device, multiple networked servers (arranged in cluster or as a server farm), a mainframe, or so forth.

In some embodiments, the network appliance may be preconfigured or dynamically configured to include the system integrated with other devices.

In a further embodiment, the device may be installed on or integrated with one or more devices such as a computing device. For example, a smartphone or a tablet to perform the functionalities of the system disclosed herein.

In a further embodiment, the system and device disclosed herein may be integrated with any number of devices in a distributed fashion.

The system disclosed herein may be implemented in hardware or a suitable combination of hardware and software. In some embodiments, the system may be a hardware device including processor(s) executing machine readable program instructions for analyzing data, and interactions between the components of the system. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) may include, for example, microprocessors, microcomputers, microcontrollers, digital signal processors, central processing units, state machines, logic circuits, and/or any devices that manipulate signals based on operational instructions, Among other capabilities, the processor(s) may be configured to fetch and execute computer readable instructions in a memory associated with the system for performing tasks such as signal coding, data processing input/output processing, power control, and/or other functions. The system may include modules as software units executing on a processor.

The system may include, in whole or in part, a software application working alone or in conjunction with one or more hardware resources. Such software applications may be executed by the processor(s) on different hardware platforms or emulated in a virtual environment. Aspects of the system, disclosed herein, may leverage known, related art, or later developed off-the-shelf software applications. Other embodiments may comprise the system being integrated or in communication with a mobile switching center, network gateway system, Internet access node, application server, IMS core, service node, or some other communication systems, including any combination thereof. In some embodiments, the components of system may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The system may include a variety of known, related art, or later developed interface(s) (not shown), including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

Generally, the present invention concerns a system for providing a video playback of an item being scanned at a checkout terminal (i.e. self-checkout terminal) located at a point of purchase. The video playback is generated to assist in verifying any suspicious or possibly fraudulent activities that may occur at the checkout terminal by the customers. The system may utilize a video source (i.e. a video camera) to record activities occurring at a transaction area of the checkout terminal. The video playback may be a segment of the video feed that is recorded by the video source. In one aspect, the present system determines a relevant portion of the video feed that may contain recordings of any suspicious fraudulent activities, thus generating the video playback to be reviewed by a store employee, such as a self-checkout attendant. The relevancy of the video feed may be determined based on a variety of data feed. Once the system identifies any discrepancy from the data feed, such as a suspicious and possibly fraudulent activity (i.e. theft, unscanned item, and the like), the video playback showing the suspicious activity may be derived from the video feed generated by the video source. As such, the selection of video playback is associated with and/or based on discrepancy identified from the data feed. The data feed may comprise a video fee, transaction data, and a weight data of the item being scanned at the checkout terminal.

This present invention provides the self-checkout attendant valuable insight into what has happened in the time period in which the alert took place. It may do this without needing to be coupled with the alerting mechanism of the self-checkout unit. The invention accomplished this by latching in the value of the time of the last known scanned good (scanned by the scanner). Upon request to the system inputted by the attendant, a video is instantly available to the attendant containing footage from the time of the last scan up until the present. Taking advantage of the fact that the transaction is halted until the alert is cleared, the video is sure to contain footage of the offending action. The instant availability of relevant video by request from an operator is a key advantage in comparison to other available video and loss prevention products.

Examples of fraudulent activities may include, but are not limited to, when a customer at the self-checkout terminal places an item that is not being transacted (i.e. transaction data shows no presence of such item being scanned) in a bagging area; places another item in place of the item being purchased; places an item outside of the bagging area, such as on the floor, input area, or other areas not specifically designated for collection of purchased item, without transacting it through the self-checkout terminal; and takes unpurchased items following the end of the transaction; and the like.

The video playback system disclosed herein may comprise a computer processing unit (i.e. a checkout terminal equipped with a processor and a memory), There may be one or more computer processing unit depending on the manner the video playback system is employed. For example, the video playback system may employ a standalone computing device implementable to an existing checkout terminal. In another aspect, the video playback system may be integrated with an existing checkout terminal carrying out the steps described herein. The components of the video playback system may be operationally interconnected, in communication with, or work in tandem in a networked system environment.

Figure 1:
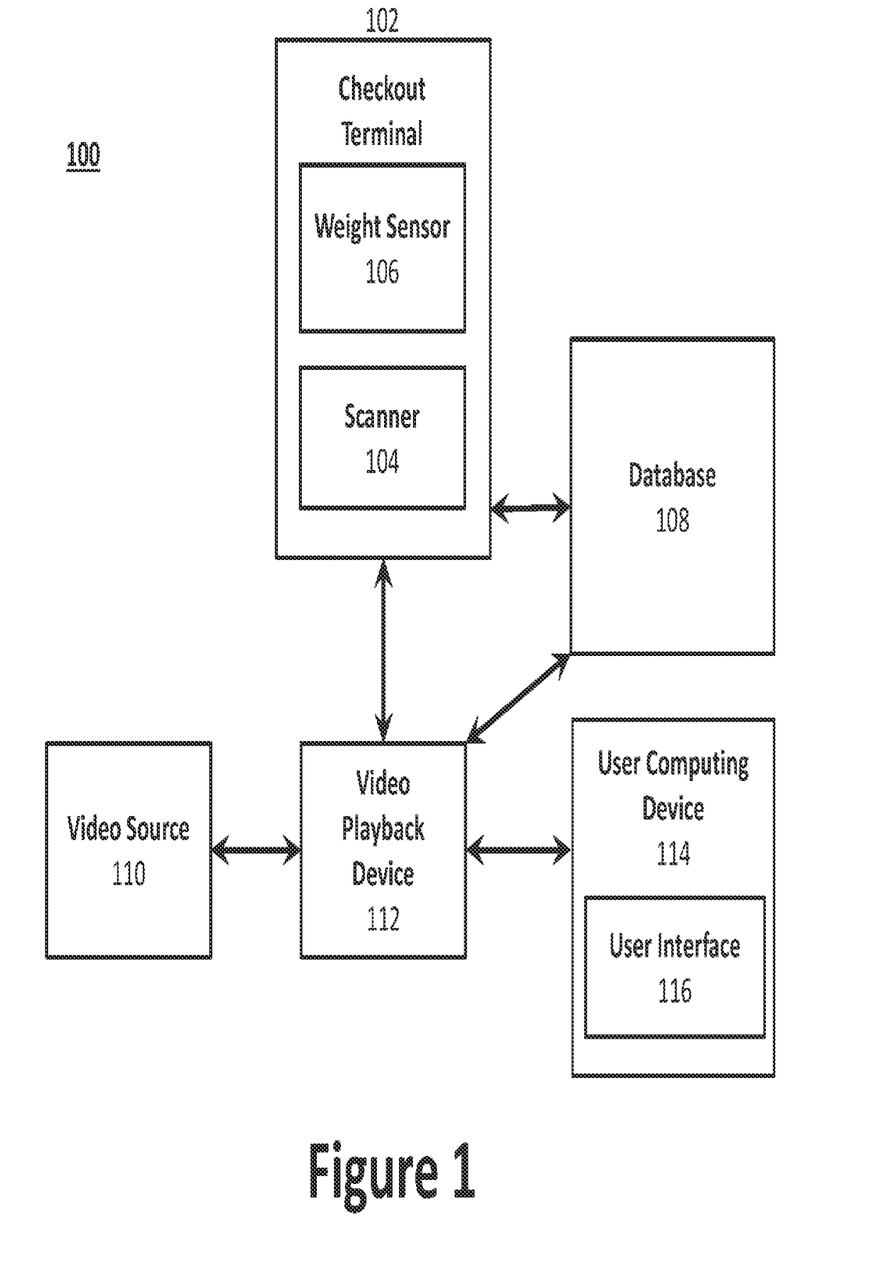
FIG. 1 provides an exemplary schematic diagram of the video playback system at a checkout terminal.
Figure 2:
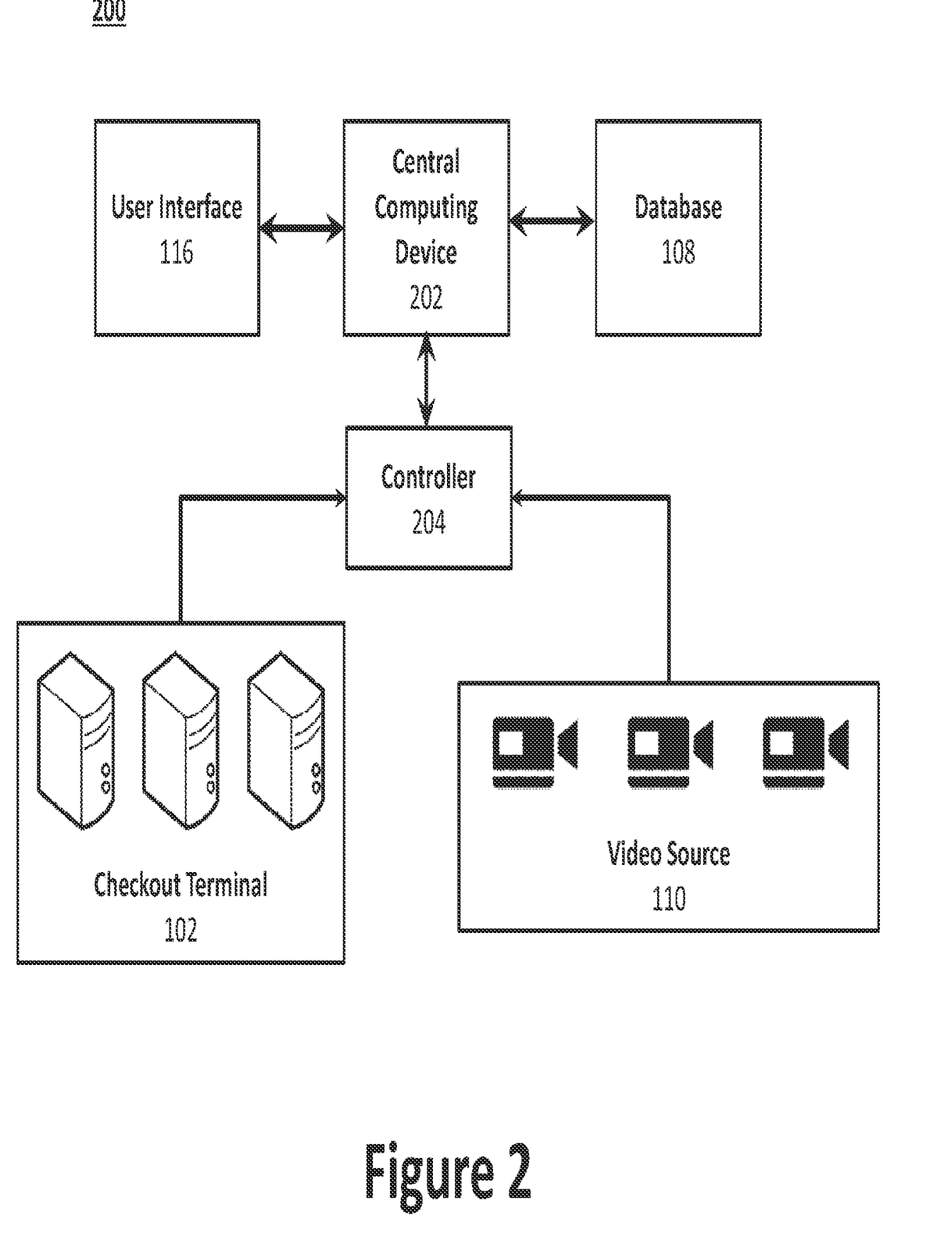
FIG. 2 provides another exemplary schematic diagram of the video playback system at a checkout terminal.

As shown is FIG. 1 and FIG. 2, the video playback system 100 may comprise a checkout terminal 102 equipped with a scanner 104 and a weight sensor 106. The scanner 104 scans an item being transacted at a transaction area of the checkout terminal. For example, a machine-readable code scanner, such as a bar code scanner, OR code scanner, and the like, may be utilized. The transaction area refers to an area within the checkout terminal where a transaction of an item being purchased occurs. The weight sensor 106 measures the weight of the item being placed at the transaction area. The video playback system 100 may further comprise a database 108, a video source 110, a video playback device 112, and a user computing device 114.

The video playback device 112 may be a computer processing unit determining and generating a video playback of a transaction activities occurring at the transaction area and/or the checkout terminal. The computer processing unit may be operable to analyze a data feed generated by monitoring an item being scanned at the checkout terminal. The data feed may comprise a video feed recorded by the video source 110, a transaction data obtained from the checkout terminal 102 (i.e. data related to the item scanned by the scanner 104), and a weight data measured by the weight sensor 106. In one aspect, the data feed may be obtained by the computer processing unit or the video playback device 112 to generate the video playback. In another aspect, as shown in FIG. 2, the video playback system may employ a central computing device 202 analyzing the data feed to generate the video playback.

The video playback system 100 may further comprise a computerized user interface 116, such as a display. The computerized user interface 116 may be employed by a user computing device 114, such as a portable video player (PVP) that is in communication with the video playback device 112. The user computing device 114 may be used by a store employee, such as a self-checkout attendant, an operator, and the like, to rapidly review the video playback generated by the video playback system to validate the video playback flagged as suspicious activities occurring at the checkout terminal.

FIG. 2 illustrates an exemplary embodiment of the video playback system 200. A controller 204 may be in communication with a plurality of checkout terminals 102 each employing a scanner to generate the transaction data. The controller 204 may further be in communication with a plurality of video sources 110 each monitoring the transaction area of the plurality of checkout terminals 102. The data feed generated by the plurality of checkout terminals 102 and the video sources 110 may be analyzed by the central computing device 202. The central computing device 202 may further be in communication with the computerized user interface 116 and the database 108.

In one aspect, the video feed may be obtained from the video source monitoring an item placed at a transaction area of the checkout terminal. The video feed may comprise at least a portion of one or more transaction activities occurring at the checkout terminal or the transaction area. The video feed or at least a portion of the video feed may be stored by the database. The video feed recorded by the video source comprises the video playback. The video playback refers to a clip or a portion of the video feed recorded by the video source that shows past recordings relative to the time of viewing the video playback.

By way of example, the system may employ the store's camera, such as a CCTV camera system, to obtain the video feed. This can be accomplished via IP cameras using RTSP video feeds. The video playback device may be communicatively coupled with the self-checkout unit or the point-of-sale controller in order to receive the transaction data resulting from scanning or transacting the item (e.g. scanned item, price, timestamp, etc.). This can be accomplished via a one-way UDP data stream, although numerous other methods of connectivity are also available, including serial interfaces, TCP, WiFi, USB, emulated devices, and many others. Furthermore, the system may not need to be communicatively coupled with the alert data from the self-checkouts.

By way of another example, the video playback device and the user computing device may be communicatively coupled via web interfaces over WiFi. The video feed may be streamed to the user computing device using HTML5. User input, feedback, and other data communications may be performed using AJAX methods via the user computing device. While these communication methods are presented as examples, it should be clear that many other communication methods are possible for communication between the video playback device and the user computing device. AJAX refers to a client-side script that communicates to and from a server/database without the need for a post-back or a complete page refresh.

The transaction data obtained by the checkout terminal may comprise a variety of information of the item as it is scanned through the checkout unit's scanner. For example, the transaction data may comprise the identity of the item, the transaction time (i.e. scan time), the price of the item, and the like. A plurality of items and their corresponding prices and identities may be catalogued and stored in the database. The transaction time refers to a point in time (i.e. temporal position) in which the transaction of an item is detected (i.e. scan time). When multiple items are scanned, the transaction data may also include transaction count which refers to a number items scanned via the scanner equipped by the checkout terminal. As the transaction count is identified using the scanner, the transaction count may be compared with a count of the items being placed at the bagging area.

Using a combination of video analysis and/or image analysis in comparison with transaction data, the system can determine if the presence of the item identified in the analysis of the video feed has a corresponding presence in the transaction data, and if not, the system may identify such transacted item as a suspicious activity and/or a fraudulent activity based on such discrepancy in transaction data analysis. As an example, the system can compare one or more data feed types to at least a portion of the transaction data to identify at least one discrepancy in a number of items transacted at the checkout terminal. Transaction data such as transaction count (e.g. scan count), thus represents the presence of an item or a number of items scanned by the scanner, while the item count from the video analysis represents the presence (or number) of items that the customer causes to move through the transaction area monitored by the video feed.

The weight data obtained from the weight sensor may be further analyzed to identify any fraudulent activity or any discrepancy in comparison to the transaction data. The weight sensor measures the weight of the item being placed at the transaction area. The transaction area may also include a bagging area where the weight of the items is measured as they are placed into a bag at the bagging area, following the scanning of the items via the checkout unit's scanner (i.e. bar code scanner and the like).

The weight sensor may be operationally coupled to the transaction area or the bagging area of the self-checkout terminal, obtaining a weight of the item being transacted and/or scanned. In order to identify a potential fraudulent activity, the weight of the item obtained may then be compared to an expected weight of the item. A mismatch of the comparison potentially indicates a fraudulent activity occurring at the checkout terminal. In one aspect, such data analysis may be carried out by the video playback device and/or the computer processing unit.

The weight data obtained by the weight sensor may be compared with an expected weight, stored in the database, corresponding to the scanned item (a type of transaction data). The database may hold the expected weight data of a plurality of items available at a store. When a mismatch between the expected weight and the actual weight (the obtained weight) is identified, as the weight of the item does not correspond with the expected weight, the video playback device may identify the item in question and correlate with the transaction data (i.e. transaction time) to determine the selection of the video playback from the video feed. As such, multiple data feed may be correlated to one another to identify the video playback.

In one embodiment, the expected weight may have a range of acceptable weight assigned to the item. For example, an apple may be assigned the expected weight tolerance based on an average weight of an apple. In another embodiment, the comparison between the measure weight and the expected weight may indicate that the weight of the item is outside the range of an acceptable weight range specified by the expected weight. If the weight of the item is outside the expected weight tolerance, such item may be identified as a fraudulent activity.

In yet another embodiment, the item may not be assigned with the expected weight. In this embodiment, the possible fraudulent activity may be identified by indicating that the item does not have an expected weight assigned, therefore the item does not belong the store's inventory. In a further embodiment, there may be a difference between the weight of the item measured from the weight sensor and the expected weight. For example, if the weight of the item is heavier and outside the expected weight tolerance, the system may identify such difference. The expected weight also may be a single number.

The expected weight tolerance may be assigned to each item being sold at the store, setting a tolerance level that may be acceptable. When the weight of the item exceeds or falls behind the expected weight tolerance of the item, the item may be flagged by the system as the possible fraudulent activity. An item may be assigned more than one of the expected weight tolerance. For example, the item may come with a bonus item during a buy one get one free event. The expected weight tolerance may be utilized to capture an item being placed in the bagging area where the item is not an item categorized in the store. In such case, the expected weight tolerance may be set to zero as a default to flag the item having a weight that is not an item categorized in the store. As such, the possible fraudulent activity may be identified based on a correlation between the transaction data (item scanned and identified) and the weight data.

Figure 3:
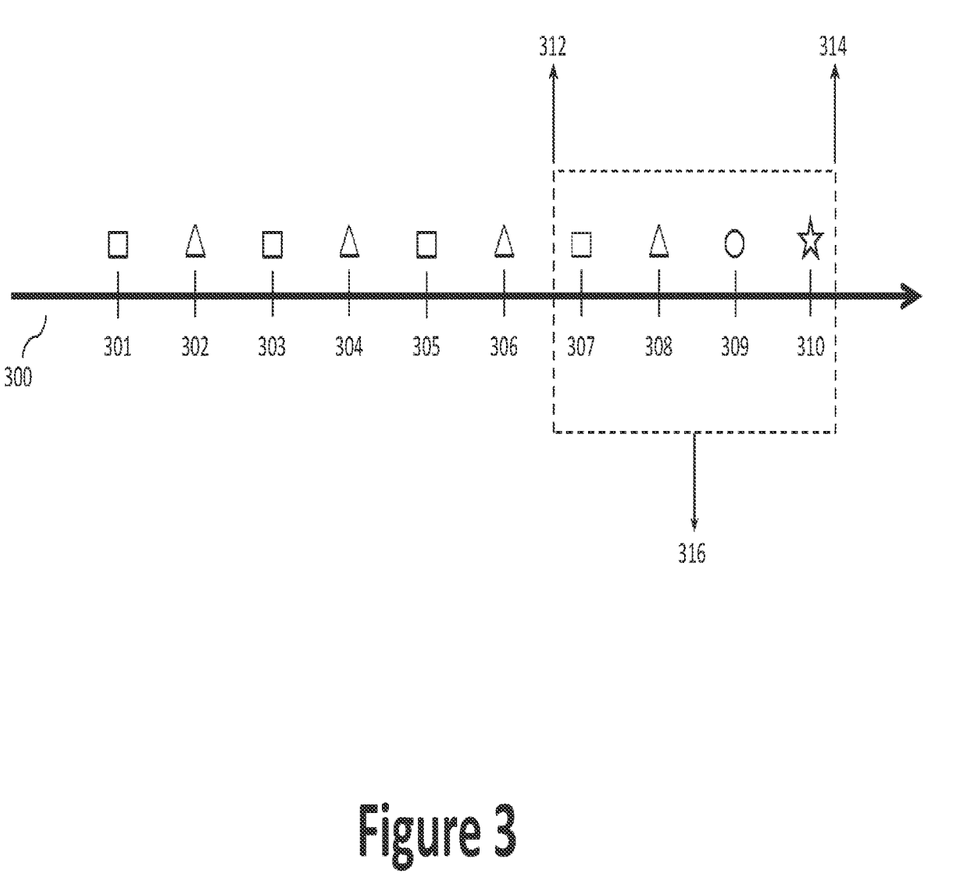
FIG. 3 provides an exemplary embodiment of selecting the video payback from the video feed.

FIG. 3 illustrates an exemplary embodiment of selecting the video payback from the video feed. The events of data feed are shown in a time domain 300. In this embodiment, a plurality of transaction times 301 303 305 are identified for a plurality of items being transacted at the checkout terminal. As each of the plurality of items are transacted at the checkout terminal, each is associated with a transaction time 301 303 305 (i.e. point in time when the scanner scan an item) and weight measurement events by the weight sensor at 302 304 306. The plurality of weight measurements occurs at 302 304 306. As such, each of the plurality of items may be sequentially associated with the transaction time 301 303 305 and the weight measurement event 302 304 306, respectively. The video playback may be selected from the video feed by latching or correlating the point in time when there occurs a suspicious or a potentially fraudulent activity with the video feed. As previously disclosed, when there is a discrepancy among the data feed (i.e. weight mismatch in comparison to transaction data), the item involved in such discrepancy in data is flagged as a potentially fraudulent item. While FIG. 3 provides a correlation between the transaction data and the weight, various other combination of data comparison can be performed. For example, the item count at the scanner can be compared with the item count at the bagging area.

The video playback may be selected based on the weight mismatch. The video playback 316 may have a start time 312 and an end time 314. In this embodiment, the item correlated with the transaction time 307 and the weight measurement 308 is identified as the discrepancy at 309. The item was scanned by the scanner at 307, weighed by the weight sensor at 308, and based on the data feed analysis (i.e. transaction data compared to weight and expected weight) the item is identified as a potentially fraudulent item at 309. As the item is flagged at 309, the video playback may start at 312 and end at 314, such that the video playback includes a series of events from 307 and 309. The video playback may be generated when a request is received by the video playback device from the user computing device, such request is received at 310. As such, a selection of the video playback 316 is identified from the video feed having a video footage over the time domain 300. The selection can be made by identifying the discrepancy from one type of data feed (i.e. weight data), correlating the transaction data (i.e. scan data) based on the point in time the discrepancy occurred, and identifying the point in time (also referred to as "temporal position") when the item in question was scanned (i.e. transaction time). Consequently, the video playback device may generate the video playback.

The video playback device or the computer processing unit may be in communication with the database to enable the selection of video playback from the video feed generated by the video source. By way of example, the system may comprise a digital video analyzer (DVA) server that takes in the video feed and other types of data feeds, and may contain the programmable logic for setting up the latching (correlation) mechanisms, the data analysis, the video analysis, and the video playback generation capabilities. The data latch may be configured to listen for data feed events and store the history of such events in the database. The video feed is then correlated with the events in temporal relation. The video playback may at least include, in its recordings, a portion of video feed between the transaction time and the time the video playback is generated to ensure capturing a footage of the suspected fraudulent activity.

In one embodiment, the start time of the video playback may be the transaction time or at least a few seconds prior to the transaction time.

In another embodiment, the start time may be determined as the transaction time of the latest scanned item at the time of video playback generation or at the time of identifying the discrepancy in correlative analysis. Such that, the system may be defaulted to generate a video playback by rewinding the video feed to the lasted scanned item's transaction time. By way of example, the data latch can be configured, for example, to listen/monitor for the scan data from the scanner of the checkout terminal and to keep a record of the last such item scanned on each of the plurality of checkout terminals. When called for, the system can then stream the video playback instantly from the time of the last scan set as the start time.

In yet another embodiment, the end time can be the present time or the time of requesting the video playback. The end time may be the point in time when the video playback is generated/selected by the video playback device or the user computing device. By way of example, the latching mechanism can be configured to latch in a start time for the video playback, and/or an end time for the video playback. The present time can also be used at the latch point for end time, indicating the video should be played up until the current moment.

The video playback's end time can seamlessly transition into real-time video feed (i.e. the live stream) after displaying the video playback to the user via the computerized user interface.

The video playback start time also may employ a predetermined constant offset. A predetermined duration prior to the transaction time may be assigned as the start time. Similarly, a constant offset from the current time can also be used for either the start or the end time. For example, the latching mechanism can be configured for 'present time −5 seconds' for the start time and a current time as the end time. In this example, when the video playback is generated, the video playback includes a 5-second video clip starting from 5 seconds-ago up until the current moment. If desired, the video playback can continue with a live stream at that point.

In some aspect, the duration of the video playback may be preset, such that the end time is determined based on the start time.

The video playback may be request by the user via the user computing device. In one aspect, additional information about the transaction, such as the transaction data, item scanned, price, and timestamp of the transaction time, may be received by the user computing device.

By way of example, the latching mechanism is constructed out of a listening service and a queue. The listening service gets data from the data feed, filters it to keep only the relevant data, and passes that data to the queue. The queue keeps at least the nth latest item, where n is configurable based on the latching specifications. In an exemplary scenario in which the latching time is the last scanned item's scan time, the last item processed by the checkout terminal is kept. This is equivalent to a value of 1 for n. By way of another example, If the latching parameter n>1, at least the nth latest item is kept, by means of a counter that starts at 0 and ends at n−1. When the counter reaches n−1, the value is latched in, and the counter resets. The counter can also start at 1 and end at n, or any similar mechanism by which a count is maintained and reset after n items. If all of the last n items is desired to be kept, then the queue is expanded to include space for all n items. As new items come in, the earliest is discarded and the new item is put on the top of the queue. In this way, a count of n items is maintained and can be accessed by the system at any time.

The speed of the video playback may be modulated to facilitate a quick review of the video playback by the user. Such modulation may be based on a number of factors fully customizable, based on relative playback speeds as well as absolute speeds. In a non-limiting example, for instance, the speed modulation can be set to playback standard video with showing no events at an elevated play speed.

In one embodiment, the speed of at least a portion of the video playback may be modulated (i.e. accelerated or decelerated).

In another embodiment, the speed of the video playback may be modulated as a function of a temporal proximity to the transaction time. For example, as the video playback gets closer to the transaction time the speed may be slowed down to allow the user more time to verify the relevant portion of the video feed. Similarly, the speed of the video playback may be accelerated when outside a set seconds from the transaction time. By way of example, the speed of at least a portion of the video playback is accelerated during the start time to the transaction time plus a preset duration and/or the transaction time plus a preset duration to the end time. By way of another example, the speed of the video playback may be decelerated from the transaction time to a predetermined duration after the transaction time.

For example, when the point in the video playback approaches an event of interest, such as an item scan, or a weight measurement, or a vision detection, the video playback rate is slowed down (i.e. 1×, or real-time playback rate). The point at which the change in speed occurs is based on the time of the event of interest. It can be exactly at that time, or a window of time around the event. The modulation may be configured to begin rate change one to several seconds before reaching the event of interest in the video playback. The video playback then may proceed at the changed rate of play until a certain point in time on or after the event of interest (i.e. transaction time). This feature can be configurable and may be set to between 0 and several seconds after the event of interest. Such modulation may be applied to the video playback more than once, depending on the number of events of interest. As such, an irrelevant portion of the video playback can be quickly reviewed by the user (i.e. self-checkout terminal attendant). Whereas, as the video playback reaches a relevant event requiring more concentration from the user, the video may be slowed down to facilitate the validation process by the user. This drastically reduces the need for the user to laboriously scrub through the video playback, or resort to replaying parts of the video playback in order to get a complete understanding of what is going on in the video playback. This, combined with other heads up display technologies previously presented in the Applicant's published patent applications US20150193780 and US20140176719, creates a video review system that an operator can use to quickly review and analyze a situation in order to prepare an optimal response. Such a system reduces the loss occurring at the store while increasing the level of customer service operators can provide.

Figure 4:
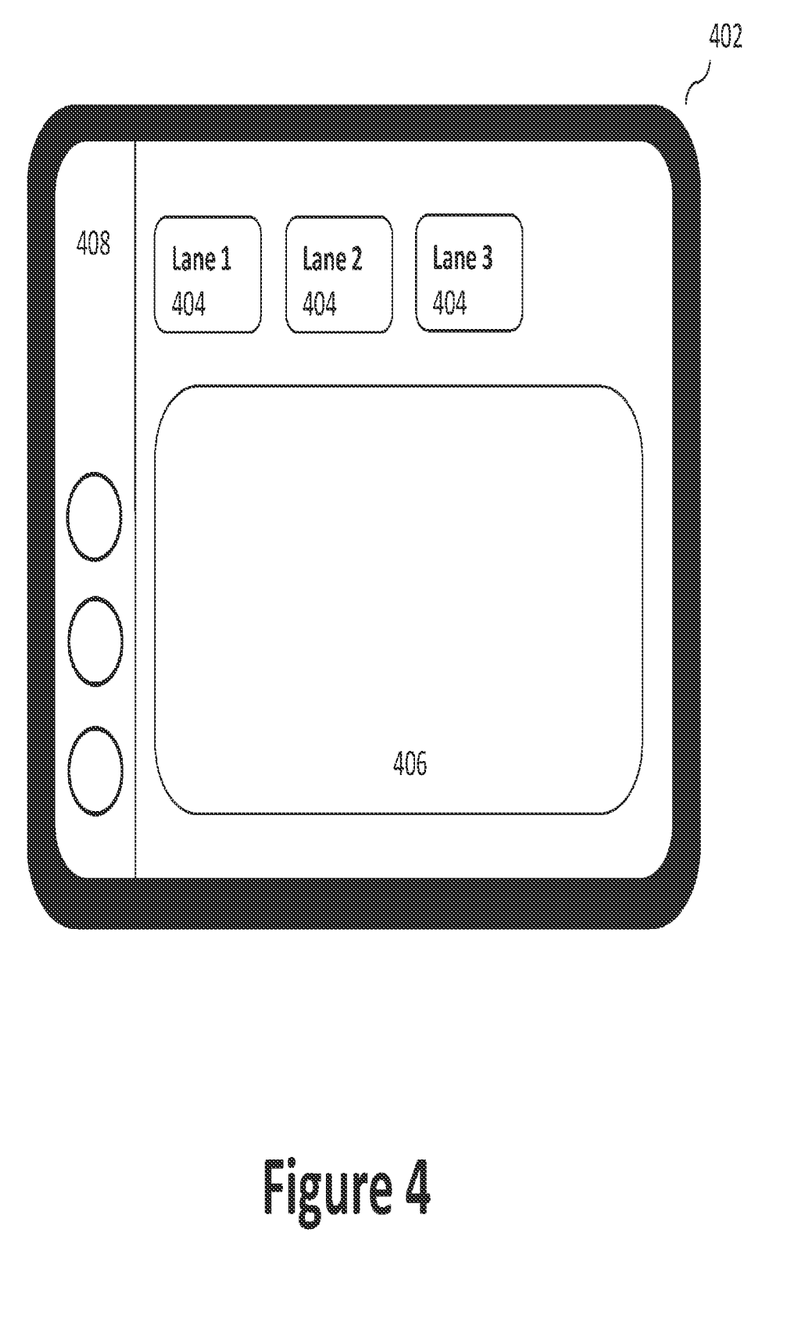
FIG. 4 provides an exemplary embodiment of a user computing device.

Turning now to FIG. 4, an exemplary user computing device 400 is presented. The user computing device, in communication with the video playback device, may provide the user interface 402 shown in FIG. 4. The user computing device 400 may request and/or receive the video playback generated by the video playback device 112 or the central computing device 202. The window shown at 406 represents a display in which the video playback may be presented. The display may also present a real-time view of the video feed. Other multiple lanes 404 may be selected to change the source of the video feed as well.

By way of example, the user computing device, such as a portable video player (PVP), component of the system can be utilized by the user to request and review the instant video playback. It may comprise a main screen (i.e. the window 406) with buttons (i.e. 404) for each of the multiple checkout terminals that are under the supervision of an attendant. When the attendant wants to request a video feed for a particular register, the attendant taps the specific register button, which brings up another window which shows the requested video feed. The PVP can be used in many form factors, from large to medium screen formats, to even smaller form factors. The PVP can be affixed to the user's body by a belt holster, or using an armband, or taking other forms of wearable electronic devices.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the present disclosure. Thus, it is to be understood that the invention may therefore by practiced otherwise than as specifically described above. Many other modifications, variations, applications, and alterations of the present disclosure will be ascertainable to those having ordinary skill in the art.

What is claimed is:

1. A method, comprising:
receiving transaction events from a terminal during transactions at the terminal, wherein receiving further includes streaming a live feed of a video for the transactions to a display;
generating, during a given transaction, a weight mismatch event for an item of the given transaction when an item weight for the item deviates from an expected weight of the item;
recording a time associated with the generating;
matching the time to a timestamp in the video captured for the given transaction;
obtaining a portion of the video that precedes the timestamp by a first amount of time and that follows the timestamp by a second amount of time;
providing the portion of the video for playback associated with the weight mismatch event, wherein providing further includes interrupting the live feed and presenting the portion for playback on the display; and
transitioning back to streaming the live feed of the video after playback of the portion on the display; and
modulating a speed of at least a portion of the playback as a function of a temporal proximity to the time associated with the weight mismatch event, wherein the speed is decelerated as the playback approaches the time associated with the weight mismatch event.

2. A method, comprising:
receiving transaction events from a terminal during transactions at the terminal;
generating, during a given transaction, a weight mismatch event for an item of the given transaction when an item weight for the item deviates from an expected weight of the item;
recording a time associated with the generating;
matching the time to a timestamp in a video captured for the given transaction;
obtaining a portion of the video that precedes the timestamp by a first amount of time and that follows the timestamp by a second amount of time, wherein obtaining further includes identifying the first amount of time as a predetermined constant offset of time that precedes the timestamp, wherein identifying further includes identifying the second amount of time as a predetermined duration of time that begins at first amount of time that precedes the timestamp and continues for the predetermined duration of time; and
providing the portion of the video for playback associated with the weight mismatch event, wherein providing further includes transitioning the video being presented on a display for playback of the portion to a live feed after the predetermined duration expires for playback of the portion on the display; and
modulating a speed of the playback as a function of a temporal proximity to a transaction time, wherein the speed is decelerated as the playback gets closer to the transaction time.

3. The method of claim 1, wherein obtaining further includes identifying the first amount of time as a start time for the given transaction based on a start transaction event and corresponding time received when the given transaction started.

4. The method of claim 1, wherein obtaining further includes identifying the second amount of time based on a requested time associated with a request for playback of the portion during the given transaction.

5. The method of claim 1, wherein generating further includes obtaining an item identifier for the item from an item scan event for the item during the given transaction and obtaining the expected weight of the item using the item identifier to search a data store and obtain the expected weight.

6. The method of claim 1, wherein generating further includes obtaining the item weight of the item for the weight mismatch event from a weight sensor associated with the checkout terminal.

7. A method, comprising: monitoring transaction events during a transaction reported by a checkout terminal; maintaining a live stream of a video captured of a transaction area associated with the checkout terminal; streaming the live stream of the video to a display being monitored by an attendant during the transaction; identifying a mismatch event for an item from the transaction events based on transaction data for the transaction reported by the checkout terminal; generating a video clip from the video that starts at a first time that precedes an event time associated with the mismatch event by a first amount of time and that ends at a second time that extends beyond the first time or that extends beyond the event time by a second amount of time; interrupting the live stream of the video on the display and streaming the video clip to the display for viewing by the attendant; restoring the live stream of the video on the display once the video clip is played on the display by the attendant; and playing the video clip back at different rates, with a playback rate slowed down approaching a certain event of interest.

8. The method of claim 7, wherein identifying further includes integrating the mismatch event into the transaction events.

9. The method of claim 7, wherein identifying further includes identifying an item identifier from the transaction data associated with a scanned item event for the item.

10. The method of claim 9, wherein identifying the item identifier further includes identifying an item weight from the transaction data associated with an item weight event for the item.

11. The method of claim 10, wherein identifying further includes using the item identifier to search a data store and obtaining an expected item weight for the item.

12. The method of claim 11, wherein using further includes identifying the mismatch event when the expected item weight for the item obtained from the data store does not comport with the item weight for the item obtained from the transaction data.

* * * * *